(12) United States Patent
Chen et al.

(10) Patent No.: US 11,180,646 B2
(45) Date of Patent: Nov. 23, 2021

(54) FILMS AND METHODS OF MAKING THE SAME

(71) Applicant: ExxonMobil Chemical Patents Inc., Baytown, TX (US)

(72) Inventors: Ke Ran Chen, Shanghai (CN); Yichen Hu, Shanghai (CN); Xin Hao Cai, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 7 days.

(21) Appl. No.: 16/904,049

(22) Filed: Jun. 17, 2020

(65) Prior Publication Data

US 2021/0054179 A1    Feb. 25, 2021

Related U.S. Application Data

(60) Provisional application No. 62/889,322, filed on Aug. 20, 2019.

(51) Int. Cl.
  *C08L 23/06* (2006.01)
  *C08J 5/18* (2006.01)

(52) U.S. Cl.
  CPC ............... *C08L 23/06* (2013.01); *C08J 5/18* (2013.01); *C08J 2323/06* (2013.01); *C08J 2423/06* (2013.01)

(58) Field of Classification Search
  CPC ...... C08L 23/06; C08L 23/08; C08L 23/0807; C08L 23/0815
  See application file for complete search history.

(56) References Cited

U.S. PATENT DOCUMENTS

| | | |
|---|---|---|
| 5,178,960 A | 1/1993 | Cook |
| 5,268,230 A | 12/1993 | Edwards |
| 5,387,630 A | 2/1995 | Edwards et al. |
| 5,569,693 A | 10/1996 | Doshi et al. |
| 5,741,563 A | 4/1998 | Mehta et al. |
| 6,242,545 B1 | 6/2001 | Jejelowo et al. |
| 6,248,845 B1 | 6/2001 | Loveday et al. |
| 6,342,566 B2 | 1/2002 | Burkhardt et al. |
| 6,384,142 B1 | 5/2002 | Burkhardt et al. |
| 6,956,088 B2 | 10/2005 | Farley et al. |
| 6,960,635 B2 | 11/2005 | Stevens et al. |
| 8,378,043 B2 | 2/2013 | Graham et al. |
| 8,476,392 B2 | 7/2013 | Kolb et al. |
| 9,956,088 B2 | 5/2018 | Glerum |
| 2009/0297810 A1 | 12/2009 | Fiscus et al. |
| 2015/0291748 A1 | 10/2015 | Malakoff |
| 2015/0368415 A1 | 12/2015 | Fiscus et al. |

FOREIGN PATENT DOCUMENTS

| | | |
|---|---|---|
| WO | WO 1997-19991 | 6/1997 |

*Primary Examiner* — Jeffrey C Mullis

(74) *Attorney, Agent, or Firm* — ExxonMobil Chemical Patents Inc.—Law Department

(57) ABSTRACT

Disclosed are films, and methods of making such films, the films comprising a first polyethylene and a hydrocarbon resin, which can provide improved friction performance. The hydrocarbon resin may be incorporated in neat form or as a blend, for instance with a second polyethylene that may be the same as or different from the first polyethylene.

13 Claims, No Drawings

FILMS AND METHODS OF MAKING THE SAME

CROSS-REFERENCE TO RELATED APPLICATION

This application claims the benefit of U.S. Provisional Application 62/889,322 filed Aug. 20, 2019, entitled "Polyethylene Blend Film Compositions Comprising Hydrocarbon Resin (Oppera) with improved Toughness and Coefficient of Friction", the entirety of which is incorporated by reference herein.

FIELD OF THE INVENTION

This invention relates to films, and in particular, to films comprising polyethylene and a hydrocarbon resin, and methods for making such films.

BACKGROUND OF THE INVENTION

Coextruded blown films are widely used in a variety of packaging as well as other applications. Film properties are often subject to the combined effect of the coextrusion process conditions and polymer compositions selected for different layers. In order to address requirements of particular end-uses, film producers would need to accordingly highlight certain properties while maintaining a well-balanced overall performance profile without having to pursuing one property at the expense of compromising another.

Films having good toughness characteristics are desired, particularly by packaging applications, in order to prevent film failure due to damage by tear, dart drop, puncture or yielding under stress. Among all polymers used for coextruded blown films, ethylene polymers, such as those prepared by Ziegler-Natta catalyst in a gas phase process, and blends thereof, have been readily available at a low manufacturing cost sufficient to justify commercial applications. More recently, metallocene polyethylenes (mPEs), which are also known to have extended versatilities and downgauging potential, have also been introduced and increased in the films to further enhance toughness-related mechanical performance. However, the limit of maximum achievable with currently available selection of ethylene polymers appears to have been reached in many specific applications and the "pure" polyethylene solutions usually tend to weaken other properties. For example, films made of mPEs featuring enhanced toughness performance demonstrate disadvantageous coefficient of friction (COF) in the absence of a slip agent. Therefore, film manufacturers have been challenged to overcome such conflict between toughness-related properties and COF by conveniently modifying current solutions to strengthen COF in parallel with preventing significant loss of or even allowing for further improvement on toughness performance.

Applicant has found that the aforementioned objective can be achieved by applying a particular amount of hydrocarbon resin as described herein in a polyethylene film, especially of a monolayer structure. Presence of the hydrocarbon resin can lead to significant reduction in COF, accompanied by increase in toughness-related properties, including tear resistance and dart impact. Therefore, film manufacturers can be released from the limit of achievable toughness-related properties and heavy reliance on slip agents to reduce friction of film surface and can instead benefit from convenience and flexibility in film design to better accommodate properties that used to be repulsive to each other.

SUMMARY OF THE INVENTION

Provided are films comprising polyethylene and a hydrocarbon resin, and methods for making such films.

In one embodiment, the present invention encompasses a film comprising a layer comprising: (a) a first polyethylene, the first polyethylene having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 50, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; and (b) from about 5 to about 20 wt % of a hydrocarbon resin, based on total weight of polymer in the layer, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof.

In another embodiment, the present invention relates to a method for making a film, comprising the steps of: (a) preparing a layer comprising (i) a first polyethylene, the first polyethylene having (i) a density of about 0.900 to about 0.925 g/cm$^3$, (ii) an MI, $I_{2.16}$, of from about 0.1 to about 10.0 g/10 min, (iii) an MIR, $I_{21.6}/I_{2.16}$, of from about 15 to about 50, (iv) a weight average molecular weight ($M_w$) of from about 20,000 to about 200,000; (v) an MWD of from about 2.0 to about 5.0; and (vi) a z-average molecular weight ($M_z$) to weight average molecular weight ($M_w$) ($M_z/M_w$) ratio of from about 1.7 to about 3.5; and (ii) from about 5 to about 20 wt % of a hydrocarbon resin, based on total weight of polymer in the layer, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof; and (b) forming a film comprising the layer in step (a).

The film described herein or made according to any method disclosed herein may have at least one of the following properties: (i) an Elmendorf tear of at least about 15% higher in the Machine Direction (MD); (ii) an Elmendorf tear of at least about 25% higher in the Transverse Direction (TD); (iii) a dart impact of at least about 4% higher; (iv) a static coefficient of friction (COF) of at least about 3% lower; and (v) a dynamic COF of at least about 40% lower, compared to that of a film free of the hydrocarbon resin but otherwise identical in terms of film formulation, thickness, and structure.

DETAILED DESCRIPTION OF THE PRESENT INVENTION

Various specific embodiments, versions of the present invention will now be described, including exemplary embodiments and definitions that are adopted herein. While the following detailed description gives specific exemplary embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.930 g/cm$^3$, typically from 0.910 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g' vis of 0.97 or above, preferably 0.98 or above); and an ethylene polymer having a density of more than 0.940 g/cm$^3$ is referred to as a "high density polyethylene" (HDPE).

As used herein, "first" polyethylene and "second" polyethylene are merely identifiers used for convenience, and shall not be construed as limitation on individual polyethylene, their relative order, or the number of polyethylene polymers used, unless otherwise specified herein.

As used herein, a structure or composition "free of" a component refers to a structure or composition substantially devoid of the component, or comprising the component in an amount of less than about 0.01 wt %, by weight of the total structure or composition.

Hydrocarbon Resin

In one aspect of the present invention, the film described herein may comprise in a layer a hydrocarbon resin. Suitable hydrocarbon resins include, but are not limited to, aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the foregoing. The hydrocarbon resins may be polar or apolar.

In one embodiment, the hydrocarbon resin useful herein is produced by the thermal polymerization of cyclopentadiene (CPD) or substituted CPD, which may further include aliphatic or aromatic monomers as described later. The hydrocarbon resin may be a non-resin or an aromatic resin. The hydrocarbon resin may have an aromatic content between 0 wt % and 60 wt %, or between 1 wt % and 60 wt %, or between 1 wt % and 40 wt %, or between 1 wt % and 20 wt %, or between 10 wt % and 20 wt %. Alternatively or additionally, the hydrocarbon resin may have an aromatic content between 15 wt % and 20 wt %, or between 1 wt % and 10 wt %, or between 5 wt % and 10 wt %. Preferred aromatics that may be in the hydrocarbon resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. Styrenic components include styrene, derivatives of styrene, and substituted styrenes. In general, styrenic components do not include fused-rings, such as indenics.

In another embodiment, the hydrocarbon resin useful herein is produced by the catalytic (cationic) polymerization of linear dienes. Such monomers are primarily derived from Steam Cracked Naphtha (SCN) and include $C_5$ dienes such as piperylene (also known as 1,3-pentadiene). Polymerizable aromatic monomers can also be used to produce resins and may be relatively pure, e.g., styrene, -methyl styrene, or from a $C_9$-aromatic SCN stream. Such aromatic monomers can be used alone or in combination with the linear dienes previously described. "Natural" monomers can also be used to produce resins, e.g., terpenes such as alpha-pinene or beta-carene, either used alone or in high or low concentrations with other polymerizable monomers. Typical catalysts used to make these resins are $AlCl_3$ and $BF_3$, either alone or complexed. Mono-olefin modifiers such as 2-methyl, 2-butene may also be used to control the MWD of the final resin. The final resin may be partially or totally hydrogenated.

In another embodiment, the hydrocarbon resin may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons, such as from 20% to 50% olefinic protons. As used herein, "substantially hydrogenated" means that the material contains less than 5% olefinic protons, or less than 4% olefinic protons, or less than 3% olefinic protons, or less than 2% olefinic protons, such as from 1% to 5% olefinic protons. The degree of hydrogenation is typically conducted so as to minimize and avoid hydrogenation of the aromatic bonds.

In yet another embodiment, the hydrocarbon resin may comprise one or more oligomers such as dimers, trimers, tetramers, pentamers, and hexamers. The oligomers may be derived from a petroleum distillate boiling in the range of 30° C.-210° C. The oligomers may be derived from any suitable process and are often derived as a byproduct of resin polymerization. Suitable oligomer streams may have an $M_n$ between 130 and 500, or between 130 and 410, or between 130 and 350, or between 130 and 270, or between 200 and 350, or between 200 and 320. Examples of suitable oligomer streams include, but are not limited to, oligomers of cyclopentadiene and substituted cyclopentadiene, oligomers of $C_4$-$C_6$ conjugated diolefins, oligomers of $C_8$-$C_{10}$ aromatic olefins, and combinations thereof. Other monomers may be present. These include $C_4$-$C_6$ mono-olefins and terpenes. The oligomers may comprise one or more aromatic monomers and may be at least partially hydrogenated or substantially hydrogenated.

Preferably, the hydrocarbon resin comprises a dicyclopentadiene, cyclopentadiene, and methylcyclopentadiene derived content of about 60 wt % to about 100 wt % of the total weight of the hydrocarbon resin. In any embodiment, the hydrocarbon resin may have a dicyclopentadiene, cyclopentadiene, and methylcyclopentadiene derived content of about 70 wt % to about 95 wt %, or about 80 wt % to about 90 wt %, or about 95 wt % to about 99 wt % of the total weight of the hydrocarbon resin. Preferably, the hydrocarbon resin may be a hydrocarbon resin that includes, in predominant part, dicyclopentadiene derived units. The term "dicyclopentadiene derived units", "dicyclopentadiene derived content", and the like refers to the dicyclopentadiene monomer used to form the polymer, i.e., the unreacted chemical compound in the form prior to polymerization, and can also refer to the monomer after it has been incorporated into the polymer, which by virtue of the polymerization reaction typically has fewer hydrogen atoms than it does prior to the polymerization reaction.

Preferred hydrocarbon resins may have a dicyclopentadiene derived content of about 50 wt % to about 100 wt % of the total weight of the hydrocarbon resin, more preferably about 60 wt % to about 100 wt % of the total weight of the hydrocarbon resin, even more preferably about 70 wt % to about 100 wt % of the total weight of the hydrocarbon resin. Accordingly, in any embodiment, suitable hydrocarbon resins may have a dicyclopentadiene derived content of about 50% or more, or about 60% or more, or about 70% or more, or about 75% or more, or about 90% or more, or about 95% or more, or about 99% or more of the total weight of the hydrocarbon resin.

Useful hydrocarbon resins may include up to 5 wt % indenic components, or up to 10 wt % indenic components. Indenic components include indene and derivatives of indene. Often, the hydrocarbon resin includes up to 15 wt % indenic components. Alternatively, the hydrocarbon resin is substantially free of indenic components.

Preferred hydrocarbon resins have a melt viscosity of from 300 to 800 centipoise (cPs) at 160° C., or more preferably of from 350 to 650 cPs at 160° C. Preferably, the melt viscosity of the hydrocarbon resin is from 375 to 615 cPs at 160° C., or from 475 to 600 cPs at 160° C. The melt viscosity may be measured by a Brookfield viscometer with a type "J" spindle according to ASTM D 6267.

Suitable hydrocarbon resins have an $M_w$ greater than about 600 g/mole or greater than about 1000 g/mole. In any embodiment, the hydrocarbon resin may have an $M_w$ of from about 600 to about 1400 g/mole, or from about 800 g/mole to about 1200 g/mole. Preferred hydrocarbon resins have a weight average molecular weight of from about 800 to about 1000 g/mole. Suitable hydrocarbon resins may have an $M_n$ of from about 300 to about 800 g/mole, or from about 400 to about 700 g/mole, or more preferably from about 500 to about 600 g/mole. Suitable hydrocarbon resins may have an $M_z$ of from about 1250 to about 3000 g/mole, or more preferably from about 1500 to about 2500 g/mole. In any embodiment, suitable hydrocarbon resins may have an $M_w/M_n$ of 4 or less, preferably from 1.3 to 1.7.

Preferred hydrocarbon resins have a glass transition temperature ($T_g$) of from about 30° C. to about 200° C., or from about 0° C. to about 150° C., or from about 50° C. to about 160° C., or from about 50° C. to about 150° C., or from about 50° C. to about 140° C., or from about 80° C. to about 100° C., or from about 85° C. to about 95° C., or from about 40° C. to about 60° C., or from about 45° C. to about 65° C. Preferably, suitable hydrocarbon resins have a $T_g$ from about 60° C. to about 90° C. DSC is used to determine glass transition temperature at 10° C./min.

Specific examples of commercially available hydrocarbon resins include Oppera™ PR 100, 100A, 100N, 101, 102, 103, 104, 105, 106, 111, 112, 115, and 120 materials, and Oppera™ PR 131 hydrocarbon resins, all available from ExxonMobil Chemical Company, ARKON™ M90, M100, M115 and M135 and SUPER ESTER™ rosin esters available from Arakawa Chemical Company of Japan, SYLVARES™ phenol modified styrene- and methyl styrene resins, styrenated terpene resins, ZONATAC terpene-aromatic resins, and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTACT™ C5/C9 resins, REGALITE™ and REGALREZ™ aromatic and REGALITE™ cycloaliphatic/aromatic resins available from Eastman Chemical Company of Kingsport, Tenn., WINGTACK™ ET and EXTRA available from Goodyear Chemical Company, FORAL™, PENTALYN™, AND PERMALYN™ rosins and rosin esters available from Hercules (now Eastman Chemical Company), QUINTONE™ acid modified $C_5$ resins, $C_5/C_9$ resins, and acid modified $C_5/C_9$ resins available from Nippon Zeon of Japan, and LX™ mixed aromatic/cycloaliphatic resins available from Neville Chemical Company, CLEARON hydrogenated terpene aromatic resins available from Yasuhara. The preceding examples are illustrative only and by no means limiting.

These commercial compounds generally have a Ring and Ball softening point (measured according to ASTM E-28 (Revision 1996)) of about 10° C. to about 200° C., more preferably about 50° C. to about 180° C., more preferably about 80° C. to about 175° C., more preferably about 100° C. to about 160° C., more preferably about 110° C. to about 150° C., and more preferably about 125° C. to about 140° C., wherein any upper limit and any lower limit of softening point may be combined for a preferred softening point range. For hydrocarbon resins, a convenient measure is the ring and ball softening point determined according to ASTM E-28.

In one embodiment, the hydrocarbon resin is present in a layer of the film described herein in an amount of from about 5 to about 20 wt %, for example, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, about 15 wt %, about 15.5 wt %, about 16 wt %, about 16.5 wt %, about 17 wt %, about 17.5 wt %, about 18 wt %, about 18.5 wt %, about 19 wt %, about 19.5 wt %, about 20 wt %, or in the range of any combination of the values recited herein, based on total weight of polymer in the layer.

The hydrocarbon resin described herein may be optionally pre-blended with one or more polyethylene polymers described herein or other polymers that are miscible with the polyethylene polymers as described herein, and then blended with polyethylene to form the polymer composition in the layer. Often, the pre-blend can comprise the hydrocarbon resin ranging from a lower limit of about 10 wt %, 20 wt %, about 30 wt %, about 40 wt %, about 50 wt %, about 60 wt %, or about 70 wt %, to an upper limit of about 90 wt %, about 80 wt %, about 70 wt %, about 60 wt %, about 50 wt %, or about 40 wt %, for example, about 10 wt %, about 20 wt %, about 30 wt %, about 40 wt %, about 50 wt %, about 60 wt %, about 70 wt %, about 80 wt %, or about 90 wt %, based on total weight of the pre-blend, or any ranges between two values as described above so long as the lower limit value is less than the upper limit value. Alternatively, the hydrocarbon resin described herein is provided in a neat form, i.e. without being blended with any other polymers, in the layer of the film, before being blended with polyethylene described herein to form the polymer composition in the layer.

Polyethylene Polymer

In one aspect of the invention, the polyethylene that can be used for the film made according to the method described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In an exemplary embodiment, the polyethylenes are made by the catalysts, activators and processes described in U.S. Pat. Nos. 6,342,566; 6,384, 142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al; and I, II METAL-LOCENE-BASED POLYOLEFINS ley & Sons 2000).

Polyethylenes that are useful in this invention include those sold under the trade names ENABLE™, EXACT™, EXCEED™, ESCORENE™, EXXCO™, ESCOR™ PAXON™, and OPTEMA™ (ExxonMobil Chemical Company, Houston, Tex., USA); DOW™, DOWLEX™, ELITE™, AFFINITY™, ENGAGE™, and FLEXOMER™ (The Dow Chemical Company, Midland, Mich., USA); BORSTAR™ and QUEO™ (Borealis AG, Vienna, Austria); and TAFMER™ (Mitsui Chemicals Inc., Tokyo, Japan).

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, using a gel permeation chromatograph ("GPC") according to the procedure disclosed herein; and/or 2. a $T_m$ of 30° C. to 150° C., preferably 30° C. to 140° C., preferably 50° C. to 140° C., more preferably 60° C. to 135° C., as determined by second melting curve based on ASTM D3418; and/or 3. a crystallinity of 5% to 80%, preferably 10% to 70%, more preferably 20% to 60%, preferably at least 30%, or at least 40%, or at least 50%, as determined by enthalpy of crystallization curve based on ASTM D3418 and calculated by the following formula:

Crystallinity %=Enthalpy (J/g)/298 (J/g)×100%;

wherein 298 (J/g) is enthalpy of 100% crystallinity polyethylene; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 6. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 7. a Shore hardness (D scale) of 10 or more, preferably 20 or more, preferably 30 or more, preferably 40 or more, preferably 100 or less, preferably from 25 to 75 (as measured based on ASTM D 2240); and/or 8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In an exemplary embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In an exemplary embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted.

In one embodiment, the film described herein comprises in a layer a first polyethylene (as a polyethylene defined herein) having (i) a density of about 0.900 to about 0.925 g/cm$^3$, (ii) an MI, $I_{2.16}$, of from about 0.1 to about 10.0 g/10 min, (iii) an MIR, $I_{21.6}/I_{2.16}$, of from about 15 to about 50, (iv) a weight average molecular weight ($M_w$) of from about 20,000 to about 200,000; (v) an MWD of from about 2.0 to about 5.0; and (vi) a z-average molecular weight ($M_z$) to weight average molecular weight ($M_w$) ($M_z/M_w$) ratio of from about 1.7 to about 3.5.

In another embodiment, the first polyethylene is produced by gas-phase polymerization of ethylene with a catalyst having as a transition metal component a bis(n-$C_{3-4}$ alkyl cyclopentadienyl) hafnium compound, wherein said transition metal component comprises from about 95 mol % to about 99 mol % of said hafnium compound.

The polyethylene polymer that can be used as the first polyethylene in the film described herein comprises from 70.0 mol % to or 100.0 mol % of units derived from ethylene. The lower limit on the range of ethylene content may be from 70.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene polymer may have an upper ethylene limit of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene. For polyethylene copolymers, the polyethylene polymer may have less than 50.0 mol % of polymer units derived from a $C_3$-$C_{20}$ olefin, preferably, an alpha-olefin, e.g., hexene or octene. The lower limit on the range of $C_3$-$C_{20}$ olefin-content may be 25.0 mol %, 20.0 mol %, 15.0 mol %, 10.0 mol %, 8.0 mol %, 6.0 mol %, 5.0 mol %, 4.0 mol %, 3.0 mol %, 2.0 mol %, 1.0 mol %, or 0.5 mol %, based on polymer units derived from the $C_3$-$C_{20}$ olefin. The upper limit on the range of $C_3$-$C_{20}$ olefin-may be 20.0 mol %, 15.0 mol %, 10.0 mol %, 8.0 mol %, 6.0 mol %, 5.0 mol %, 4.0 mol %, 3.0 mol %, 2.0 mol %, or 1.0 mol %, based on polymer units derived from the $C_3$ to $C_{20}$ olefin. Any of the lower limits may be combined with any of the upper limits to form a range. Comonomer content is based on the total content of all monomers in the polymer.

In a class of embodiments, the first polyethylene may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In some embodiments, the first polyethylene may have a density in accordance with ASTM D-4703 and ASTM D-1505/ISO 1183 of from about 0.900 to about 0.925 g/cm³, from about 0.910 to about 0.921 g/cm³, from about 0.912 to about 0.918 g/cm³, or from about 0.914 to 0.918 g/cm³.

The weight average molecular weight ($M_w$) of the first polyethylene may be from about 15,000 to about 500,000 g/mol, from about 20,000 to about 200,000 g/mol, from about 25,000 to about 150,000 g/mol, from 150,000 to about 400,000 g/mol, from about 200,000 to about 400,000 g/mol, or from about 250,000 to about 350,000 g/mol.

The first polyethylene may have a molecular weight distribution (MWD) or ($M_w/M_n$) of from about 1.5 to about 5.0, from about 2.0 to about 5.0, from about 3.0 to about 4.5, or from about 2.5 to about 4.0. MWD is measured using a gel permeation chromatograph ("GPC") on a Waters 150 gel permeation chromatograph equipped with a differential refractive index ("DRI") detector and a Chromatix KMX-6 on line light scattering photometer. The system is used at 135° C. with 1,2,4-trichlorobenzene as the mobile phase using Shodex (Showa Denko America, Inc.) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. Polystyrene is used for calibration. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. $M_w/M_n$ is calculated from elution times. The numerical analyses are performed using the commercially available Beckman/CIS customized LALLS software in conjunction with the standard Gel Permeation package. Reference to $M_w/M_n$ implies that the $M_w$ is the value reported using the LALLS detector and $M_n$ is the value reported using the DRI detector described above.

The first polyethylene may have a z-average molecular weight ($M_z$) to weight average molecular weight ($M_w$) ($M_z/M_w$) ratio greater than about 1.5, or greater than about 1.7, or greater than about 2.0. In some embodiments, this ratio is from about 1.7 to about 3.5, from about 2.0 to about 3.0, or from about 2.2 to about 3.0.

The first polyethylene may have a melt index (MI) or ($I_{2.16}$) as measured by ASTM D-1238-E (190° C./2.16 kg) of about 0.1 to about 300 g/10 min, about 0.1 to about 100 g/10 min, about 0.1 to about 50 g/10 min, about 0.1 g/10 min to about 10.0 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, or about 0.5 g/10 min to about 1.0 g/10 min The first polyethylene may have an MIR ($I_{21.6}$ (190° C., 21.6 kg)/$I_{2.16}$ (190° C., 2.16 kg)) of from about 15 to about 50, from about 20 to about 40, from about 22 to about 38, from about 25 to about 35, from about 35 to about 50, or from about 40 to about 50.

In a class of embodiments, the first polyethylene may contain less than 5.0 ppm hafnium, less than 2.0 ppm hafnium, less than 1.5 ppm hafnium, or less than 1.0 ppm hafnium. In other embodiments, the polyethylene polymers may contain from about 0.01 ppm to about 2 ppm hafnium, from about 0.01 ppm to about 1.5 ppm hafnium, or from about 0.01 ppm to about 1.0 ppm hafnium.

Typically, the amount of hafnium is greater than the amount of zirconium in the polyethylene polymer. In a particular class of embodiments, the ratio of hafnium to zirconium (ppm/ppm) is at least about 2.0, at least about 10.0, at least about 15, at least about 17.0, at least about 20.0, at least about 25.0, at least about 50.0, at least about 100.0, at least about 200.0, or at least about 500.0 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in the polyethylene polymer. Thus, the upper limit on the ratio of hafnium to zirconium in the polymer may be quite large.

In several classes of embodiments, the first polyethylene may have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In several classes of embodiment, the first polyethylene may have a composition distribution breadth index (CDBI) of from 20% to 35%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice.

In several of the classes of embodiments described above, the first polyethylene may have a Broad Orthogonal Comonomer Distribution or "BOCD." "BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 $cm^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

The breadth of the composition distribution is characterized by the T75-T25 value, wherein T25 is the temperature at which 25% of the eluted polymer is obtained and T75 is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the first polyethylene as described herein may have a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, or 25.0 or greater, wherein $T_{25}$ is the temperature at which 25% of the eluted polymer is obtained and $T_{75}$ is the temperature at which 75% of the eluted polymer is obtained in a TREF experiment as described herein.

The first polyethylene as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the first polyethylene as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, wherein $F_{80}$ is the fraction of polymer that elutes below 80° C.

Additionally, the melt strength of the first polyethylene polymer at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The melt strength of the first polyethylene may be in the range from about 1 to about 100 cN, about 1 to about 50 cN, about 1 to about 25 cN, about 3 to about 15 cN, about 4 to about 12 cN, or about 5 to about 10 cN.

Materials and processes for making the first polyethylene have been described in, for example, U.S. Pat. No. 6,956,088, particularly Example 1; U.S. Publication No. 2009/0297810, particularly Example 1; U.S. Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

The polyethylene polymer suitable for use as the first polyethylene is commercially available from ExxonMobil Chemical Company, Houston, Tex., and sold under Exceed XP™ Performance Polymer. Exceed XP™ Performance Polymer offers step-out performance with respect to, for example, dart drop impact strength, flex-crack resistance, and machine direction (MD) tear, as well as maintaining stiffness at lower densities. Exceed XP™ mPE also offers optimized solutions for a good balance of melt strength, toughness, stiffness, and sealing capabilities which makes this family of polymers well-suited for blown film/cast film solutions.

In another exemplary embodiment, the hydrocarbon resin described herein is present in the film described herein in a pre-blend with a second polyethylene (as a polyethylene defined herein). Preferably, the second polyethylene has (i) a density of about 0.900 to about 0.925 g/cm³, (ii) an MI, $I_{2.16}$, of from about 0.1 to about 10.0 g/10 min, (iii) an MIR, $I_{21.6}/I_{2.16}$, of from about 15 to about 50, (iv) a weight average molecular weight ($M_w$) of from about 20,000 to about 200,000; (v) an MWD of from about 2.0 to about 5.0; and (vi) a z-average molecular weight ($M_z$) to weight average molecular weight ($M_w$) ($M_z/M_w$) ratio of from about 1.7 to about 3.5. In various embodiments, the second polyethylene may conform to characteristics as set out above for the first polyethylene. The second polyethylene may be the same as or different from the first polyethylene. Preferably, the second polyethylene is the same as the first polyethylene.

The first and the second polyethylene polymers, if present, in the film described herein may each be optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition.

In an exemplary embodiment, the first polyethylene is present in an amount of from about 50 wt % to about 95 wt %, for example, about 50 wt %, about 55 wt %, about 60 wt %, about 65 wt %, about 70 wt %, about 75 wt %, about 80 wt %, about 85 wt %, about 90 wt %, about 95 wt %, or in the range of any combination of the values recited herein, based on total weight of polymer in the layer. In an exemplary embodiment where the hydrocarbon resin in the layer is present in a pre-blend with the second polyethylene described herein, the weight ratio between the hydrocarbon resin and the second polyethylene is from about 1:2 to about 2:1, for example, about 1:2, about 3:5, about 2:3, about 3:4, about 4:5, about 1:1, about 5:4, about 4:3, about 3:2, about 5:3, about 2:1, or anywhere between any combination of the values recited herein.

In a class of embodiments, in addition to polyethylene as described above, the film of the present invention may further comprise other polymers, including without limitation other polyolefins, polar polymers, and cationic polymers, in any layer of the film.

Additives

The film described herein may also contain in at least one layer various additives as generally known in the art. Examples of such additives include a slip agent, an antiblock, a filler, an antioxidant, an ultraviolet light stabilizer, a thermal stabilizer, a pigment, a processing aid, a crosslinking catalyst, a flame retardant, and a foaming agent, etc., and combinations thereof. Especially, the film made according to the present invention may further comprise functional additives suitable for particular packaging applications, for example, a tackifier, an antifungal agent, and an ultraviolet absorber for silage films. Preferably, the additives may each individually present in an amount of about 0.01 wt % to about 50 wt %, or about 0.1 wt % to about 15 wt %, or from 1 wt % to 10 wt %, based on total weight of the film layer.

Any additive useful for the film may be provided separately or together with other additive(s) of the same or a different type in a pre-blended masterbatch, where the target concentration of the additive is reached by combining each neat additive component in an appropriate amount to make the final composition.

In one preferred embodiment, the film layer comprising the hydrocarbon resin described herein is free of any slip agent.

Film Structures

In addition to the layer comprising the hydrocarbon resin described herein, the film of the present invention may comprise further layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, is spunbond fibers, and nonwovens (particularly polypropylene spunbond fibers or nonwovens), and substrates coated with inks, dyes, pigments, and the like.

In particular, the film described herein can also include layers comprising materials such as ethylene vinyl alcohol (EVOH), polyamide (PA), polyvinylidene chloride (PVDC), or aluminium, so as to obtain barrier performance for the film where appropriate.

The thickness of the films may range from 10 to 200 μm in general and is mainly determined by the intended use and properties of the film. Stretch films may be thin; those for shrink films or heavy duty bags are much thicker. Conveniently, the film has a thickness of no more than about 150 μm, for example, from 10 to 150 μm, from 20 to 120 μm, from 30 to 100 μm, or from 40 to 80 μm. In an exemplary embodiment where the film is a monolayer film, the film may have a thickness of no more than about 50 μm.

In an exemplary embodiment, the film has a monolayer structure, comprising: (a) a first polyethylene, based on total weight of the polymer in the monolayer film, the first polyethylene having (i) a density of about 0.900 to about 0.925 $g/cm^3$, (ii) an MI, $I_{2.16}$, of from about 0.1 to about 10.0 g/10 min, (iii) an MIR, $I_{21.6}/I_{2.16}$, of from about 15 to about 50, (iv) a weight average molecular weight ($M_w$) of from about 20,000 to about 200,000; (v) an MWD of from about 2.0 to about 5.0; and (vi) a z-average molecular weight ($M_z$) to weight average molecular weight ($M_w$) ($M_z/M_w$) ratio of from about 1.7 to about 3.5; and (b) a blend of a hydrocarbon resin and the first polyethylene, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof;

wherein the hydrocarbon resin is present in an amount of from about 5 to about 20 wt %, based on total weight of polymer in the monolayer film; wherein the weight ratio between the hydrocarbon resin and the first polyethylene in the blend is from about 1:2 to about 2:1.

Film Properties and Applications

The films of the present invention may be adapted to form flexible packaging laminate films, including stand-up pouches, as well as a wide variety of other applications, such as cling film, low stretch film, non-stretch wrapping film, pallet shrink, over-wrap, agricultural, and collation shrink film. The film structures that may be used for bags are prepared such as sacks, trash bags and liners, industrial liners, produce bags, and heavy duty bags. The film may be used in flexible packaging, food packaging, e.g., fresh cut produce packaging, frozen food packaging, bundling, packaging and unitizing a variety of products.

The inventive film described herein may have at least one of the following properties: (i) an Elmendorf tear of at least about 15% higher in the MD; (ii) an Elmendorf tear of at least about 25% higher in the TD; (iii) a dart impact of at least about 4% higher; (iv) a static COF of at least about 3% lower; and (v) a dynamic COF of at least about 40% lower, compared to that of a film free of the hydrocarbon resin but otherwise identical in terms of film formulation, thickness, and structure.

It has been unexpectedly discovered that the film design as set out herein, by virtue of introduction of the hydrocarbon resin described herein in a particular amount into the film, can advantageously and economically mitigate the defect in COF commonly seen in films made of mPEs with highlighted toughness performance by simultaneously improving both COF and toughness-related properties, thus leading to a better-accomplished overall performance profile of the so-obtained film favored by a promising spectrum of end-uses.

Methods for Making the Film

Also provided are methods for making films of the present invention. A method for making a film may comprise the steps of: (a) preparing a layer comprising (i) a first polyethylene, the first polyethylene having (i) a density of about 0.900 to about 0.925 g/cm$^3$, (ii) an MI, $I_{2.16}$, of from about 0.1 to about 10.0 g/10 min, (iii) an MIR, $I_{21.6}/I_{2.16}$, of from about 15 to about 50, (iv) a weight average molecular weight ($M_w$) of from about 20,000 to about 200,000; (v) an MWD of from about 2.0 to about 5.0; and (vi) a z-average molecular weight ($M_z$) to weight average molecular weight ($M_w$) ($M_z/M_w$) ratio of from about 1.7 to about 3.5; and (ii) from about 5 to about 20 wt % of a hydrocarbon resin, based on total weight of polymer in the layer, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof; and (b) forming a film comprising the layer in step (a).

The films described herein may be formed in step (b) by any of the conventional techniques known in the art including blown extrusion, cast extrusion, coextrusion, blow molding, casting, and extrusion blow molding. For example, the composition for preparing the films can be extruded in a molten state through a flat die and then cooled to form a film. Alternatively, the composition can be extruded in a molten state through an annular die and then blown and cooled to form a tubular, blown film, which can then be axially slit and unfolded to form a flat film. Films of the invention may be unoriented, uniaxially oriented or biaxially oriented. Physical properties of the film may vary from those of the polymer blend, depending on the film forming techniques used.

In one embodiment of the invention, the film described herein is formed by using blown techniques, i.e., to form a blown film. For example, the polymer composition formulated as described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 65 mm extruder that is water-cooled, resistance heated, and has an L/D ratio of 30:1. The film can be produced using a 16 cm die with a 1.5 mm die gap, along with a dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 240° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

In another embodiment of the invention, cast films can be prepared using a pilot scale commercial cast film line machine as follows. Pellets of the polymeric blend are melted at temperatures ranging from about 200° C. to about 300° C., with the specific melt temperature being chosen to match melt viscosities of the various resins. The melts are conveyed to a coextrusion adapter that combines the melt flows into a multilayer, coextruded structure. This layered flow is distributed through a single manifold film extrusion die to the desired width. The die gap opening is typically about 0.6 mm to about 1 mm. The material is then drawn down to the final gauge. The material draw down ratio is typically about 21:1 for films of about 50 μm. A vacuum box or air knife can be used to pin the melt exiting the die opening to a primary chill roll maintained at about 30° C.

Multilayer films may be formed by methods well known in the art. The materials forming each layer may be coextruded through a coextrusion feedblock and die assembly to yield a film with two or more layers adhered together but differing in composition. Coextrusion can be adapted to cast film or blown film processes. Multilayer films may also be formed by extrusion coating whereby a substrate material is contacted with the hot molten polymer as the polymer exits the die. Extrusion coatings are generally processed at higher temperatures than cast films, typically about 200° C. to about 300° C., in order to promote adhesion of the extruded material to the substrate. Other extrusion coating processes are known in the art, including those described, for example, in U.S. Pat. Nos. 5,268,230, 5,178,960 and 5,387,630. The coating may be a monolayer film or a multilayer film. The substrate can also be stock for milk cartons, juice containers, films, etc. For instance, an already formed polyethylene film may be extrusion coated with another polyethylene film as the latter is extruded through the die. Multilayer films may also be formed by combining two or more single layer films prepared as described above. The total thickness of multilayer films may vary based upon the application desired. A total film thickness of about 5 to about 100 μm, more typically about 10 to about 50 μm, is suitable for most applications. Those skilled in the art will appreciate that the thickness of individual layers for multilayer films may be adjusted based on desired end use performance, resin or copolymer employed, equipment capability and other factors.

EXAMPLE

The present invention, while not meant to be limited by, may be better understood by reference to the following example and table.

The Example illustrates toughness-related properties and COF demonstrated by is four inventive film samples (Samples 2-3 and 5-6) respectively comprising the hydrocarbon resin described herein and two different polyethylene polymers formulated as set out herein in comparison with two comparative film samples (Sample 1 in comparison with Samples 2-3 and Sample 4 in comparison with Samples 5-6, respectively) free of the hydrocarbon resin but otherwise identical in terms of film formulation, thickness, and structure. All samples were prepared on a coextrusion blown film line according to the method described herein with a monolayer structure of 50 μm. Polyethylene and resin products used in the samples include: OPPERA™ PR 100N modifier (as the hydrocarbon resin described herein) (ExxonMobil Chemical Company, Houston, Tex., USA); PE-1 polymer (as the first and the second polyethylene described herein) (prepared with a bis (n-propylcyclopentadienyl) hafnium dichloride metallocene catalyst as further described in U.S. Pat. No. 6,956,088; density: 0.916 g/cm$^3$; MI: 0.20 g/10 min; MIR: 49.4; $M_w$: 131,704; MWD: 3.25; $M_z/M_w$: 1.97) (ExxonMobil Chemical Company, Houston, Tex., USA), and PE-2 polymer (as the first and the second polyethylene described herein) (prepared with a bis (n-propylcyclopentadienyl) hafnium dichloride metallocene catalyst as further described in U.S. Pat. No. 6,956,088; density: 0.916 g/cm$^3$; MI: 0.50 g/10 min; MIR: 30.1; $M_w$: 152,197; MWD: 4.02; $M_z/M_w$: 2.48) (ExxonMobil Chemical Company, Houston, Tex., USA). OPPERA™ PR 100N modifier in the four inventive samples was employed in a pre-blended masterbatch prepared by 50 wt % of OPPERA™ PR 100N modifier and 50 wt % of either PE-1 (referred to as Masterbatch-1) or PE-2 polymer (referred to as Masterbatch-2), based on total weight of the masterbatch.

Elmendorf tear strength was measured in both MD and TD based on ASTM D1922-06a using the Tear Tester 83-11-01 from TMI Group of Companies and measures the energy required to continue a pre-cut tear in the test sample, presented as tearing force in gram. Samples were cut across the web using the constant radius tear die and were free of any visible defects (e.g., die lines, gels, etc.).

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head dropped from a height of 0.66±0.01 m was employed. Dart impact measures the energy causing a film to fail under specified conditions of impact of a freely-falling dart. This energy is expressed in terms of the weight (mass, g) of the dart falling from a specified height, which would result in 50% failure of tested samples. Samples have a minimum width of 20 cm and a recommended length of 10 m.

Coefficient of friction (COF) was determined following ASTM 1894 covering determination of the coefficients of starting (static) and sliding (dynamic) friction of a plastic film when sliding over itself. Samples prepared 150 mm in length and 65 mm in width are attached to a 200 g sled pulled at a speed of 150 mm/min. The forces to get the sled started (static) and to maintain motion (dynamic) are respectively measured. The static COF is expressed by the initial friction force reading divided by the sled weight, while the dynamic COF is expressed by the average friction force reading obtained during uniform sliding of the surfaces divided by the sled weight.

Samples were conditioned at 23° C.±2° C. and 50%±10% relative humidity for at least 40 hours prior to determination of all properties.

Film formulations (based on total weight of polymer in the film) and corresponding test results therefor are depicted in the Table.

As shown in the Table, the inventive film samples featuring a particular amount of the hydrocarbon resin described herein can outperform the comparative samples free of the hydrocarbon in terms of a reduced COF, particularly as reflected by a significant reduction in the dynamic COF of at least about 40%, accompanied by toughness-related properties, including Elmendorf tear strength and dart impact, elevated to an even more remarkable level. Furthermore, it can be seen that such property-enhancing effect acted in an incremental manner as the amount of the hydrocarbon grew within the range as set out herein. This suggests promising potential of the inventive film in conveniently and economically upgrading friction performance in step with toughness performance by use of the hydrocarbon resin described herein in place of common slip agents. Therefore, without being bound by theory, by manipulating addition of the hydrocarbon resin, better-accomplished overall performance of films mainly made of toughness-highlighting polyethylene polymers as desired by different end-uses can be expected.

TABLE

Film formulations (wt %) and test results of samples in the Example

| Sample No. | Film Formulation | Elmendorf Tear MD (g/μm) | Elmendorf Tear TD (g/μm) | Dart Impact (g/μm) | Static COF | Dynamic COF |
|---|---|---|---|---|---|---|
| 1 | PE-1 (100) | 4.1 | 14.0 | 10.2 | 0.80 | 0.82 |
| 2 | PE-1 (90) Masterbatch-1 (10) | 4.8 | 17.6 | 10.7 | 0.77 | 0.49 |
| 3 | PE-1 (80) Masterbatch-1 (20) | 6.0 | 23.5 | 17.0 | 0.75 | 0.37 |
| 4 | PE-2 (100) | 6.3 | 14.8 | 16.9 | 1.75 | 1.75 |
| 5 | PE-2 (90) Masterbatch-2 (10) | 8.6 | 24.6 | 21.4 | 0.87 | 0.71 |
| 6 | PE-2 (80) Masterbatch-2 (20) | 11.2 | 31.0 | 20.6 | 0.99 | 0.52 |

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A film, comprising a layer comprising:
   (a) a first polyethylene, the first polyethylene having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 50, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; and
   (b) from about 5 to about 20 wt % of a hydrocarbon resin, based on total weight of polymer in the layer, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof;
   wherein the film has at least one of the following properties: (i) an Elmendorf tear of at least about 15% higher in the Machine Direction (MD); (ii) an Elmendorf tear of at least about 25% higher in the Transverse Direction (TD); (iii) a dart impact of at least about 4% higher; (iv) a static coefficient of friction (COF) of at least about 3% lower; and (v) a dynamic COF of at least about 40% lower, compared to that of a film free of the hydrocarbon resin but otherwise identical in terms of film formulation, thickness, and structure.

2. The film of claim 1, wherein the first polyethylene is present in an amount of from about 50 wt % to about 95 wt %, based on total weight of the layer.

3. The film of claim 1, wherein the hydrocarbon resin is present in a neat form.

4. The film of claim 1, wherein the hydrocarbon resin is present in a pre-blend with a second polyethylene.

5. The film of claim 4, wherein the second polyethylene has (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 50, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5.

6. The film of claim 4, wherein the second polyethylene is the same as the first polyethylene.

7. The film of claim 4, wherein the weight ratio between the hydrocarbon resin and the second polyethylene is from about 1:2 to about 2:1.

8. The film of claim 1, wherein the layer is free of any slip agent.

9. The film of claim 1, wherein the film has a thickness of no more than about 50 μm.

10. The film of claim 1, wherein the film is a monolayer film.

11. A monolayer film, comprising:
   (a) a first polyethylene, based on total weight of the polymer in the monolayer film, the first polyethylene having (i) a density of about 0.900 to about 0.925 (ii) a melt index (MI), $I_{2.16}$, of from about 0.1 to about 10.0 g/10 min, (iii) a melt index ratio (MIR), $I_{21.6}/I_{2.16}$, of from about 15 to about 50, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; and
   (b) a blend of a hydrocarbon resin and the first polyethylene, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof; wherein the hydrocarbon resin is present in an amount of from about 5 to about 20 wt %, based on total weight of polymer in the monolayer film; wherein the weight ratio between the hydrocarbon resin and the first polyethylene in the blend is from about 1:2 to about 2:1;

wherein the monolayer film has at least one of the following properties: (i) an Elmendorf tear of at least about 15% higher in the MD; (ii) an Elmendorf tear of at least about 25% higher in the TD; (iii) a dart impact of at least about 4% higher; (iv) a static COF of at least about 3% lower; and (v) a dynamic COF of at least about 40% lower, compared to that of a film free of the hydrocarbon resin but otherwise identical in terms of film formulation, thickness, and structure.

12. A method for making a film, comprising the steps of:
(a) preparing a layer comprising (i) a first polyethylene, the first polyethylene having (i) a density of about 0.900 to about 0.925 g/cm$^3$, (ii) a melt index (MI), $I_{2.16}$, of from about 0.1 to about 10.0 g/10 min, (iii) a melt index ratio (MIR), $I_{21.6}/I_{2.16}$, of from about 15 to about 50, (iv) a weight average molecular weight ($M_w$) of from about 20,000 to about 200,000; (v) a molecular weight distribution (MWD) of from about 2.0 to about 5.0; and (vi) a z-average molecular weight ($M_z$) to weight average molecular weight ($M_w$) ($M_z/M_w$) ratio of from about 1.7 to about 3.5; and (ii) from about 5 to about 20 wt % of a hydrocarbon resin, based on total weight of polymer in the layer, the hydrocarbon resin comprising an aliphatic hydrocarbon resin, a hydrogenated aliphatic hydrocarbon resin, an aromatic hydrocarbon resin, a hydrogenated aromatic hydrocarbon resin, a cycloaliphatic hydrocarbon resin, a hydrogenated cycloaliphatic hydrocarbon resin, a polyterpene resin, a terpene-phenol resin, a rosin ester resin, a rosin acid resin, or a combination thereof; and (b) forming a film comprising the layer in step (a);

wherein the film has at least one of the following properties: (i) an Elmendorf tear of at least about 15% higher in the MD; (ii) an Elmendorf tear of at least about 25% higher in the TD; (iii) a dart impact of at least about 4% higher; (iv) a static COF of at least about 3% lower; and (v) a dynamic COF of at least about 40% lower, compared to that of a film free of the hydrocarbon resin but otherwise identical in terms of film formulation, thickness, and structure.

13. The method of claim 12, wherein the film in step (b) is formed by blown extrusion, cast extrusion, coextrusion, blow molding, casting, or extrusion blow molding.

* * * * *